W. P. HAUBERT AND JOHN HAUBERT, OF CANTON, OHIO.

Letters Patent No. 87,169, dated February 23, 1869.

IMPROVED BITTERS.

The Schedule referred to in these Letters Patent and making part of the same.

*To all whom it may concern:*

Be it known that we, W. P. HAUBERT and JOHN HAUBERT, both of Canton, in the county of Stark, and State of Ohio, have invented a new and useful Medical Compound, for use as a general family medicine, to which we have given the name of "German Bitters;" and we do hereby declare that the following is a full, clear, and exact description of the ingredients forming our compound, and of the proportions and mode of preparing and using the same, which will enable others skilled in the art to make and use our compound.

The names and proportions of the ingredients to be used in preparing forty (40) gallons of our compound are as follows:

Four (4) pounds of anise-seed;
Two (2) pounds of orange-peel, ground;
Four (4) pounds of fennel-seed;
Two (2) pounds of ground gentian;
Four (4) pounds of pulverized canella;
Four (4) pounds of German chamomile;
Twelve (12) pounds of white sugar;
Twenty (20) gallons of corn high-wine;
Twenty (20) gallons of water; and
One (1) pound of burnt brown sugar, (this last ingredient being used to give the compound a good color.)

To prepare the compound, we take a whiskey-barrel, of sufficient capacity to hold somewhat over forty gallons, take out one head, and insert a false bottom, having a large number of holes bored in it, about four inches from the true bottom, which is left in the barrel, and the barrel is set up in an erect position.

Into this barrel we introduce a bag of muslin, of a size a little less than that of the barrel, the bottom of which bag rests on the false bottom, and the top of which is secured by being turned over the upper edge of the barrel, and fastened by a rope, tied around it and the barrel.

Into this bag and barrel, arranged as described, we put all of the first six-named ingredients, together with all of the wine, and two or three gallons of water, if thought desirable, although this addition of water at the first of the operation is not absolutely necessary.

This mixture is to be well stirred every morning, and about one and one-half gallon of water is to be added at each stirring, until the whole quantity of water is introduced into the mixture.

After this process has been carried on for one week, the white and burnt brown sugar are added to the mixture, and the same process is continued for another week.

The barrel herein described should be provided with a faucet in the side, between the true and false bottoms, and during the first few mornings while this process is going on, the liquid matter in the barrel should be drawn off, and turned in again at the top of the barrel, in order to effect a more thorough mingling of the seeds and all parts of the liquid matter.

During all this process, the barrel should be kept tightly covered as much as possible, in order to prevent the escape of any steam or vapor which might rise from the liquid matter.

At the end of the two weeks, the liquid matter, which constitutes the medical compound or bitters proper, is drawn off into a clean barrel, where it is left to stand three weeks, when it is ready for bottling and use, although it can be left for a longer time if desired, as age improves the quality of the bitters.

It may be found desirable to use a fine muslin strainer-bag in connection with the faucet in the first-described barrel, while the liquid is being finally drawn off, to catch any impurities which might escape through the muslin bag in the barrel.

This medical compound or bitters is especially recommended for its direct and salutary effect on the heart, liver, kidneys, and bowels. It is a sure cure for nausea, creates an appetite, and is a powerful aid to digestion.

It cures rheumatism, dyspepsia, bowel-complaints, dysentery, chills and fevers of all kinds, depression of spirits, and fainting, and will counteract the effect of liquor in a few minutes.

The ordinary dose for adults is a wineglassful, and for children in proportion.

For fever and ague, take three wineglassfuls just before going to bed; but of course the amount and times for doses will vary with the persons treated, and is a matter to be definitely settled only by experience with the patient.

Having thus fully described our invention, we wish it understood that although we have given what we consider to be the proper proportions for the several ingredients used in preparing our compound, as well as the best mode of preparing the same, we reserve the right to vary somewhat therefrom, as experience may show to be necessary, as

What we claim as our invention, and desire to secure by Letters Patent, is—

The medical compound herein described, prepared from the ingredients, and in the manner substantially as herein described.

As evidence that we claim the foregoing, we have hereunto set our hands, in the presence of two witnesses, this 16th day of January, A. D. 1869.

W. P. HAUBERT.
JOHN HAUBERT.

Witnesses:
JOB ABBOTT,
RUTH K. ABBOTT.